United States Patent Office 3,782,988
Patented Jan. 1, 1974

3,782,988
ASPHALTIC COATINGS
Stephen H. Alexander, St. Louis, Mo., and Arnold J. Hoiberg, Montville, N.J., assignors to The Bank of New York, New York, N.Y.
No Drawing. Continuation-in-part of abandoned application Ser. No. 616,489, Feb. 16, 1967, which is a continuation-in-part of abandoned application Ser. No. 223,819, Sept. 14, 1962. This application Nov. 6, 1969, Ser. No. 874,669
Int. Cl. C08h 13/00, 17/02; C09d 3/24
U.S. Cl. 106—282      6 Claims

ABSTRACT OF THE DISCLOSURE

An asphalt coating composition comprising 50 to 75% by weight of a catalytically air-blown asphalt with a penetration of 40 to 60 mm./10 and a softening point of 135 to 170° F., 15 to 50% by weight of an asphalt solvent, 5 to 20% by weight of short asbestos fibre and 5 to 15% by weight of expanded vermiculite.

RELATED APPLICATIONS

The present application is a continuation-in-part of application Ser. No. 616,489, filed Feb. 16, 1967, now abandoned which was a continuation-in-part of application Ser. No. 223,819, filed Sept. 14, 1962 (now abandoned).

BACKGROUND OF THE INVENTION (1) Field of the invention

The present invention relates to asphalt coating compositions. More particularly, the present invention relates to a particular asphalt breathing-type of weatherproof coating particularly adapted for insulation, roofing and the like.

(2) The prior art

When ordinary mineral-filled asphaltic coating compositions are applied on high temperature insulation, masonry, portland cement concrete, and other materials which contain voids filled with water or other vapor or gas, blisters are likely to form on the surface of the coating upon subsequent heating of the coated object. Blistering may be especially bad when liquid water is present in the voids. The degree and amount of blistering depend somewhat on the rate and amount of vapor formation and on the ease of escape of the vapor by paths other than through deformation of the asphaltic coating. Coatings which blister are generally coatings which are highly impervious and thus very effective in preventing water from entering the coating and are equally effective in preventing any water or vapor which is present within or enters the porous coated material from escaping except by deformation of the coating.

It is known that blistering may be avoided by employing an asphalt emulsion type of coating, i.e., a coating formed from water, asphalt, asbestos fiber and with or without other mineral fillers. Such a coating is known as a breathing type of coating. That is, the coating is porous and permeable to water vapor, thus permitting water vapor to escape through the coating without causing blistering or deformation of the coating. However, asphalt emulsion coatings are presently often found inadequate in that they are not of a sufficiently long life when exposed to weathering. Also, many of these asphalts are so rigid and lacking in elastic qualities as to crack and rupture under the stress of expansion and contraction or other slight change in shape of the coated material such as occurs when used as a top coating for a built up roofing system employing fibrous underlayers. Many of these coatings have also been found inadequate in their moisture vapor transmission which is a measure of their ability to successfully "breathe," thereby preventing blistering and pitting.

Asphalts, either natural or petroleum derived, have been used for many years and yet very little is known of their chemical structure. The study of asphalts is complicated by the complex structure of these materials and and the fact that individual asphalts vary widely in their physical and chemical make up. With higher boiling points and increases in molecular weight, a staggering number of isomers can occur, and it is impossible to do more than break these down into groups. These groups have recently been the subject of considerable study by asphalt chemists who have used solvent fractionation, molecular stills, thermal diffusion and other techniques to produce groups for further study by infrared spectroscopy, nuclear magnetic reasonance, spectrometry. This work has added considerable insight to the chemistry of asphalt, but such knowledge is unsufficient to provide an understanding of the physical behavior of the asphaltic material.

Research on the composition of asphalt has demonstrated that its nature is variably colloidal. The asphaltene fraction, having the highest molecular weight, is the disperse phase, and the resins are considered the dispersing medium, with the oils and content of wax which they can dissolve being the continuous phase. Both from the colloidal and solubility aspects, it is apparent that in addition to the importance of the quantity of each fraction in determining the degree of dispersion and behavior of the asphalt, the character of each fraction is very important.

While the desirability of having a knowledge of the above factors in producing protective asphaltic coatings is well recognized, asphalt technology has not progressed to an extent permitting the exact determination of these factors, and the very best that can be done in defining the properties to be possessed by the asphalt base stock and the finished material is by empirical physical properties such as softening point, penetration, viscosities, boiling point, etc. Only by considering such properties as an entity can the possible service behavior of the finished product be characterized.

In considering the properties of an asphalt, it is necessary to consider the processing techniques whereby the asphalt was obtained. This is necessary since all asphalts can be substantially modified by the processing technique. This is exemplified by the development of the air-blowing or oxidation of asphalt and particularly, what is called catalytic air-blowing of asphalt. Catalytic air-blowing comprises air blowing asphalt in the presence of a phosphorus containing catalyst selected from the group consisting of the stable acids of phosphorus, such as orthophosphoric acid and pyrophosphoric acid, phosphorus pentoxide, red phosphorus, and the stable sulfides of phosphorus, such as phosphorus sesquisulfide, phosphorus sulfide and phosphorus pentasulfide. The blowing is carried out at an elevated temperature and preferably within the range of from about 400° to 550° F. for the time required to effect the desired change in physical properties which can vary anywhere from about 10 minutes to about five to eight hours depending upon the characteristics of the base being blown. The asphalts produced by the air-blowing technique are characterized by higher than normal penetration values and higher elongation without rupture at a given softening point and as a result find use in applications in which the usual untreated asphalts have no commercial utility.

It is an object of the present invention to provide an improved asphaltic composition. It is an object of the present invention to provide an improved asphaltic coating composition. It is a particular object of the present invention to provide a new and improved asphaltic coating composition which does not blister or pit to an appreciable extent. Another particular object of the present invention is to provide a new and improved asphaltic coating composition which possesses the property of being a "breathing" type of asphaltic composition and which does not blister or pit to any extent and yet does provide an adequate seal for liquid water. Yet, another particular object of the present invention is to provide a new and improved asphaltic coating composition having high moisture vapor transmission values. It is yet another particular object of the present invention to provide an asphaltic coating composition capable of withstanding long-term weathering. It is still another particular object of the present invention to provide a new and improved asphaltic composition possessed of comparatively high plasticity. Additional objects will become apparent from the following descripiton of the invention herein disclosed.

SUMMARY OF THE INVENTION

It has now been found that the above objects are fulfilled by an asphalt coating composition comprised of a mixture of the following ingredients: Approximately 50 to 75 percent by weight of a catalytically air-blown asphalt having a penetration at 77° F. of from 40–60 mm./10 and a softening point of from 135 to 170° F., 15 to 50 percent by weight of a suitable solvent, 5 to 20 percent by weight of short asbestos fiber, and 5 to 15 percent by weight of expanded vermiculite. The catalytically air-blown asphalt useful herein is one which has been air-blown at an elevated temperature in the presence of a phosphorous containing catalyst selected from the group consisting of the stable acids of phosphorous, phosphorous pentoxide, red phosphorous and the stable sulfides of phosphorous. This method of catalytically air-blowing asphalt is further described in U.S. Pat. 2,450,756.

DESCRIPTION OF PREFERRED EMBODIMENTS

To further describe and to illustrate the present invention, the following examples are presented. These examples are in no way to be construed as limiting to the present invention.

EXAMPLE I

A Smackover crude oil from the Smackover Field, Ark., was reduced in a steam and vacuum distillation unit to a penetration at 77° F. of 92 mm./10. This asphaltic material was then catalytically air blown in the presence of 1.3 percent by weight of $P_2O_5$ to a new penetration at 77° F. of 53 mm./10 and a softening point of 145° F. (R and B). The air-blow asphalt was then cut back with a solvent in the proportion of approximately 29.6 parts by weight solvent to 70.4 parts by weight asphalt. The solvent used was a 306–360° F. boiling range naphtha. To the cutback asphalt was then added expanded vermiculite and asbestos fibers in the following amounts.

| | Parts by weight |
|---|---|
| Cutback asphalt | 83.0 |
| Expanded vermiculite | 8.0 |
| Asbestos, 7T grade | 9.0 |

The expanded vermiculite is of a size such that at least 90 percent is retained on a 100 mesh screen. The asbestos grade will be hereinafter more thoroughly discussed. This coating will hereinafter be referred to as Coating A.

EXAMPLE II

In order to demonstrate the improvement in the coating properties obtained through the use of the present asphaltic composition, a series of comparative tests were carried out comparing Coating A with a more conventional asphaltic composition hereinafter referred to as Coating B whose preparation and composition are described below.

The conventional Coating B was prepared from a steam and vacuum reduced South Arkansas crude oil of 130/150 seconds float at 122° F. by non-catalytically air blowing this asphalt to a pentration of 50 mm./10 at 77° F. and a softening point of 146° F. To this asphalt was added the 306 to 360° boiling range naphtha of Example I in a proportion of 36.9 parts by weight naphtha to 63.1 parts by weight asphalt. To this was subsequently added spent clay and asbestos in the following proportions.

| | Parts by weight |
|---|---|
| Cutback asphalt | 80 |
| Spent clay [1] | 10 |
| Asbestos, 7T grade | 10 |

[1] A diatomaceous earth used for treating lube oil.

In order to compare these two compositions, test roof patches of each composition were prepared as follows: A test substrate was prepared by adhering two plies of 15 pound asphalt saturated roof felt to the existing roof of a building with a Standard 160 to 180 grade mopping asphalt. The test compositions A and B were then applied in 4 x 4 patches of 1/32" and 1/16" thickness with a roofing brush.

Test 1

This test illustrates the relative blistering and pitting of Coatings A and B. A grade of 10 indicates no deterioration, 5 indicates 50% of the area of the patch deteriorated, and 0 indicates 100% of the area deteriorated by blistering and pitting.

| | A | | | |
|---|---|---|---|---|
| | 1/32 inch | | 1/16 inch | |
| Thickness (wet) | Pit | Blister | Pit | Blister |
| Grade at— | | | | |
| 6 months | 10 | 10 | 10 | 10 |
| 12 months | 10 | 10 | 10 | 10 |
| 24 months | 10 | 10 | 10 | 10 |
| 36 months | 10 | 9 | 10 | 10 |

| | B | | | |
|---|---|---|---|---|
| | 1/32 inch | | 1/16 inch | |
| Thickness (wet) | Pit | Blister | Pit | Blister |
| Grade at— | | | | |
| 6 months | 10 | 10 | 10 | 10 |
| 12 months | 9 | 6 | 9.5 | 6 |
| 24 months | 10 | 6 | 10 | 7 |
| 36 months | 7 | 5 | 9 | 7 |

Test 2

Coatings A and B were compared for moisture vapor transmission (MVT). The MVT was obtained by a modification of ASTM Method of E96–53T, Procedure C. The modification consisted of a 50 percent relative humidity in the test cup and a relative humidity of 0 in the test chamber with no air circulation. The following table gives the perm inch of MVT or as otherwise stated grains per sq. ft. per hour per inch of Hg per inch of thickness.

| | |
|---|---|
| A | 0.027 |
| B | 0.003 |

Test 3

Coatings A and B were tested as to hours to failure. The coatings were weathered according to ASTM Method D529–39T and tested for failure according to the criteria given in ASTM Method D1670–59T with a spark generating device capable of producing 12,000 volts. Failure was determined by spark testing showing six discontinuities in the coating. The results were as follows:

Hours to failure:

| | |
|---|---|
| A | 10,000 |
| B | 5,950 |

Test 4

Both coatings, Coatings A and B, were tested for elongation by Federal Test Procedure TT–P–14lb, Method 622.2.

Elongation, percent:
A ------------------------------------------- 10.2
B -------------------------------------------- 4.8

The property of plasticity illustrated by the elongation data shown above is very desirable in a coating composition since compositions having poor elongation properties tend to crack and pull apart on contraction and expansion or other change in shape of the coated article. The above elongation data was obtained after a four year period of weathering.

EXAMPLE III

The steam and vacuum reduced Smackover crude oil aphalt of Example I was used as a starting material in this asphalt. As in the prior example, it was air blown with 1.3% $P_2O_5$. The new penetration after air blowing was 53 mm./10 at 77° F. and the softening point was 145° F. This catalytically air-blown asphalt was cut back with a 300 to 360° F. boiling range naphtha in the proportion by weight of naphtha to asphalt of 32.2 to 67.8. To this was added expanded vermiculite and 7T asbestos in the following proportions.

| | Parts by weight |
|---|---|
| Cutback asphalt | 83 |
| Expanded vermiculite | 8 |
| 7T asbestos | 9 |

This material was found to have a moisture vapor transmission constant approximately 10 times greater than a conventional coating.

EXAMPLE IV

To further demonstrate the advantages of the coating compositions of the present invention, two asphaltic coating compositions were prepared and compared as to elongation according to the "Bend Test." One of these asphaltic coatings, hereinafter referred to as Coating D, was prepared in accordance with the present invention while the other coating composition, hereinafter referred to as Coating E, was not prepared in accordance with the present invention.

To prepare Composition D, an asphalt having a penetration of 85 to 100 mm./10 at 77° F. was air blown in the presence of 1.3 percent by weight $P_2O_5$ to a new penetration of 45 to 58 mm./10 at 77° F. and a new softening point of 140 to 150° F. Approximately 53.3 parts by weight of this catalytically air blown asphalt was then cut back with approximately 46.7 parts by weight of a cutback solvent, the cutback solvent used being a 300–360° F. boiling range naphtha. To the cutback asphalt was then added vermiculite and asbestos fiber in the following amounts.

| | Parts by weight |
|---|---|
| Cutback asphalt | 84.6 |
| Expanded vermiculite | 7.2 |
| Asbestos, 7T grade | 8.2 |

The expanded vermiculite is of a size such that at least 90 percent is retained on a 100 mesh screen. The asbestos grade is more thoroughly discussed hereinafter.

Coating E was prepared in substantially the same manner as was Composition D, the only difference between the two compositions being that the air-blown asphalt of Composition E was not catalytically air blown and was one having a penetration of 18 to 22 mm./10 at 77° F. and a softening point of 170 to 175° F.

The "Bend Test" by which these Compositions D and E were compared was carried out as follows: the two compositions were screed coated on galvanized steel strips measuring 1 inch by 6 inches by 0.022 inch. The coating was applied to a thickness of 3/32 inch and was oven dried at 140° F. for 12 days prior to making the "Bend Test." The "Bend Test" consisted of placing the coated galvanized steel strips across a mandrel centered and perpendicular with respect to the mandrel and then bending the galvanized steel strips around the mandrel during a period of two seconds until the ends of the strips were in a plane having a 90 degree relationship to the original plane of the strip and substantially parallel to one another. The condition of the coating composition, particularly with respect to cracking and fracturing, is observed. If the coating cracks or fractures, it is generally considered as having failed the "Bend Test."

Two sets of comparative "Bend Tests" were made with Compositions D and E as described above. One set of tests was carried out at 85° F. with a mandrel having a one inch diameter while the other set of tests was carried out at 73° F. with a mandrel having a one and one half inch diameter. The results are presented in the following table:

| | 85° F., 1 inch mandrel | 73° F., 1½ inch mandrel |
|---|---|---|
| Composition: | | |
| D | Four strips tested—none fractured or cracked. | Two strips tested—neither fractured or cracked. |
| E | Four strips tested and all failed by cracking. | Three strips tested and all failed by cracking. |

EXAMPLE V

A Smackover crude oil from the Smackover Field, Ark., was reduced in a steam and vacuum distillation unit to a penetration at 77° F. of 92 mm./10. This asphaltic material was then catalytically air blown in the presence of 1.3 percent by weight of $P_2O_5$ to a new penetration at 77° F. of 53 mm./10 and a softening point of 145° F. (R and B). The air-blown asphalt was then cut back with a solvent in the proportion of approximately 33.3 parts by weight solvent to 66.7 parts by weight asphalt. The solvent used was a 306–360° F. boiling range naphtha. To the cutback asphalt was then added expanded vermiculite and asbestos fibers in the following amounts:

| | Parts by weight |
|---|---|
| Cutback asphalt | 83 |
| Expanded vermiculite | 8 |
| Asbestos, 7T grade | 9 |

The expanded vermiculite is of a size such that at least 90 percent is retained on a 100 mesh screen. The asbestos grade will be hereinafter more thoroughly discussed. This coating will hereinafter be referred to as Coating F.

A conventional Coating G was prepared from a steam and vacuum reduced South Arkansas crude oil of 130/150 seconds float at 122° F. by non-catalytically air blowing this asphalt to a penetration of 50 mm./10 at 77° F. and a softening point of 146° F. To this asphalt was added a 306 to 360° boiling range naphtha in a proportion of 36.9 parts by weight naphtha to 63.1 parts by weight asphalt. To this was subsequently added expanded vermiculite and asbestos in the following proportions:

| | Parts by weight |
|---|---|
| Cutback asphalt | 84 |
| Expanded vermiculite | 7 |
| Asbestos, 7T grade | 9 |

Coatings F and G were applied to 2¾" × 5⅞" aluminum panels by screed bars to a wet film thickness of 60 to 65 mils. The coated panels were tested as to hours to failure in an accelerated weathering test. The coatings were weathered in an Atlas Single Arc Weather-O-Meter according to ASTM Method D529–59T, Cycle A, and tested for failure according to the criteria given in ASTM Method D1670–59T with a spark generating device capable of producing 12,000 volts. Failure was determined by spark testing showing six discontinuities in the coating. The results were as follows:

Hours to failure:
F ------------------------------------- 10,175+
G ------------------------------------- 7,300

These data show that Coating F, made according to my invention, has weathering properties that are superior to prior art coatings, such as Coating G.

The asphalt coating compositions of my invention exhibit outstanding flexibility and elongation properties after prolonged exposure to weathering when compared to prior art coating compositions that are made from asphalts that have not been air blown in the presence of a phosphorous containing catalyst.

The source of the asphalt which is catalytically air blown for the present composition is not especially critical in that it is only necessary that it be one which can be catalytically air blown to an asphalt having a penetration of 40 to 60 mm./10 at 77° F. and a softening point of from 135 to 170° F. A particularly useful asphalt for catalytically air blowing to obtain the asphalt of the present composition is obtained by steam and vacuum reducing an asphaltic base crude oil to an asphaltic residue having a penetration at 77° F. of from approximately 85 to 225 mm./10. This value, of course, is not limiting since it will not be constant and will depend largely upon the crude source.

The catalytically air-blown asphalt is cut back with a solvent in order to obtain the desired composition. Generally, 15 to 50 percent by weight of the solvent is satisfactory for preparing a cutback asphalt having the desired properties. It is preferred, however, to cut back the asphalt with approximately 20 to 40 percent by weight of solvent. The solvent is not critical in the sense that a particular solvent is required.

For reasons of economy, petroleum solvents having an initial boiling point of about 150° F., and an end point of less than 650° F. are preferred. Other materials, however, which are good solvents for asphalt and which are non-toxic may be employed. Kerosene, gas oil and naphtha, falling within the previously mentioned boiling range are preferred. A particularly preferred solvent is a 300 to 360° F. boiling range naphtha. In choosing a solvent, attention should also be given as to whether the solvent is free from offensive odors and is non-corrosive.

To the cutback asphalt there is added about 5 to 20 percent by weight of an asbestos fiber from the group classified as 7M or 7T grade under the Canadian Crysolite Asbestos Classification. More often, however, it will be preferred to use approximately 5 to 15 percent by weight of an asbestos fiber. Whether the 7M or 7T grade fiber is used will depend upon whether a spray or trowel grade mixture is desired. The asbestos fiber is graded on a Quebec Standard Asbestos Testing Machine comprising a series of super-imposed boxes having screens with varying meshes. In addition to the asbestos fiber, there is added to the asphaltic composition approximately 5 to 15 percent by weight of an expanded vermiculite. The expanded vermiculite is one of a size such that at least 90 percent is retained on a 100 mesh screen. It is preferred that the amount of expanded vermiculite be within the range of from approximately 5 to 10 percent by weight of the mixture.

Though it is not particularly important whether the asbestos or the expanded vermiculite are added to the asphaltic composition first, it will generally be somewhat preferred that the asbestos be first placed in the mixture. Otherwise, the vermiculite particle size might be reduced by overmixing if it is added prior to the asbestos.

In the above description of the various components of the present composition, it is to be understood that all percents by weight are referring to the uncured asphaltic composition.

We claim:

1. An asphalt coating composition consisting essentially of a mixture of approximately 50 to 75 percent by weight of a catalytically air-blown asphalt having a penetration at 77° F. of from 40 to 60 mm./10 and a softening point of from 135 to 170° F., said catalytically air-blown asphalt being one which has been air blown at an elevated temperature in the presence of a phosphorous containing catalyst selected from the group consisting of the stable acids of phosphorous, phosphorous pentoxide, red phosphorous and the stable sulfides of phosphorous, 15 to 50 percent by weight of a solvent for said asphalt, 5 to 20 percent by weight of a short asbestos fiber and 5 to 15 percent by weight of an expanded vermiculite.

2. The composition of claim 1 wherein the amount of solvent is within the range of 20 to 40 percent.

3. The composition of claim 1 wherein the amount of asbestos fiber is within the range of 5 to 15 percent.

4. The composition of claim 1 wherein the amount of expanded vermiculite is within the range of 5 to 10 percent.

5. The composition of claim 1 wherein the short asbestos fiber is selected from the group consisting of 7M and 7T grades of asbestos.

6. The composition of claim 5 wherein the expanded vermiculite is of a size such that 90 percent is retained on a 100 mesh screen.

References Cited
UNITED STATES PATENTS

| | | | |
|---|---|---|---|
| 2,450,756 | 10/1948 | Hoiberg | 208—22 X |
| 2,762,755 | 9/1956 | Kinnaird | 208—22 X |
| 2,890,967 | 6/1959 | Hoiberg et al. | 106—278 |
| 2,923,638 | 2/1960 | Hoiberg et al. | 106—278 |
| 2,923,639 | 2/1960 | Wilkinson | 106—282 |
| 2,939,794 | 6/1960 | Wilkinson | 106—278 X |
| 2,973,280 | 2/1961 | Hoiberg et al. | 106—281 |

JOAN B. EVANS, Primary Examiner

U.S. Cl. X.R.

117—140, 168

PO-1050
(5/69)

UNITED STATES PATENT OFFICE
CERTIFICATE OF CORRECTION

Patent No. 3,782,988    Dated January 1, 1974

Inventor(s) Stephen H. Alexander et al

It is certified that error appears in the above-identified patent and that said Letters Patent are hereby corrected as shown below:

Column 2, line 16, after "resonance" and before the comma, insert -- spectrometry, and electron paramagnetic resonance --. Column 5, line 70, "mesuring" should read -- measuring --.

Signed and sealed this 16th day of July 1974.

(SEAL)
Attest:

McCOY M. GIBSON, JR.
Attesting Officer

C. MARSHALL DANN
Commissioner of Patents